US011885179B2

(12) United States Patent
Wang

(10) Patent No.: US 11,885,179 B2
(45) Date of Patent: Jan. 30, 2024

(54) ROLLER BLIND

(71) Applicant: SHENZHEN RUIQING XINGYE PLASTIC CO. LTD., Guangdong (CN)

(72) Inventor: Chih-Yung Wang, Taipei (TW)

(73) Assignee: SHENZHEN RUIQING XINGYE PLASTIC CO. LTD., Shenzhen (CN)

( * ) Notice: Subject to any disclaimer, the term of this patent is extended or adjusted under 35 U.S.C. 154(b) by 189 days.

(21) Appl. No.: 17/491,599

(22) Filed: Oct. 1, 2021

(65) Prior Publication Data

US 2023/0104031 A1 Apr. 6, 2023

(51) Int. Cl.
*E06B 9/42* (2006.01)
*E06B 9/58* (2006.01)

(52) U.S. Cl.
CPC . *E06B 9/42* (2013.01); *E06B 9/58* (2013.01)

(58) Field of Classification Search
CPC ................. E06B 9/42; E06B 9/58; E06B 9/88
See application file for complete search history.

(56) References Cited

U.S. PATENT DOCUMENTS 9,453,370 B2 * 9/2016 Bohlen ..................... E06B 9/88
10,745,966 B2 * 8/2020 Chen ......................... E06B 9/42
11,365,583 B2 * 6/2022 Tao ........................... E06B 9/42
2014/0096920 A1 * 4/2014 MacDonald .............. E06B 9/80 160/405
2016/0083999 A1 * 3/2016 Chen ......................... E06B 9/50 160/315
2018/0106100 A1 * 4/2018 Foley ...................... E06B 9/322
2020/0123853 A1 * 4/2020 Chen ......................... E06B 9/90
2021/0156196 A1 * 5/2021 Tao ........................... E06B 9/42
2022/0056761 A1 * 2/2022 Qiu ........................... E06B 9/90
2022/0106835 A1 * 4/2022 Francoeur ................. E06B 9/42
2022/0325579 A1 * 10/2022 Wu ........................... E06B 9/60

FOREIGN PATENT DOCUMENTS

TW M605068 U 12/2020

* cited by examiner

*Primary Examiner* — Beth A Stephan
(74) *Attorney, Agent, or Firm* — Muncy, Geissler, Olds & Lowe, P.C.

(57) ABSTRACT

A roller blind includes an upper rail, a roller blind device located at one end of the upper rail, a position limiting device located at another end of the upper rail, two fixing brackets provided for pivotally connecting with the roller blind device and the position limiting device and fixing above a window, a lower rail disposed at an interval below the upper rail, and a blind material. Two ends of the blind are fixed on the upper rail and the lower rail. The blind is wound on a surface of the upper rail. One end of the position limiting device protrudes from an outer end of the upper rail and is combined with the fixing bracket at a right side and is capable of adjusting lower and upper limit positions of the lower rail from an outer side of the fixing bracket at the right side.

6 Claims, 18 Drawing Sheets

ROLLER BLIND

FIELD OF THE INVENTION

The invention relates to a curtain, and more particularly to a roller blind.

BACKGROUND OF THE INVENTION

Please refer to FIG. 1 and FIG. 2. A roller blind 1 used in windows and doors for blocking sunlight and decoration has become very popular in home and office. The existing roller blind 1 is provided for a user to pull a lower rail 12 to retract or unfold a blind 11 of the roller blind 1. However, since there is no suitable upper position limiting device and lower position limiting device in the roller blind 1, as the blind 11 is retracted and the position A1 of the lower rail 12 is too high, the lower rail 12 of the blind 11 turns over to another side of the upper rail 13 due to a force generated by retraction of the upper rail 13. The result is that the highest point A2 of the retracted lower rail 12 becomes lower than an appropriate position after retraction, and the user has to manually put the lower rail 12 back to its original position. Also, since the roller blind 1 is not provided with a lower position limiting device, as a force of unfolding the blind 11 downward is too strong, it causes the top 111 of the blind 11 to detach from a connection point B wound on the upper rail 13, and the blind 11 falls off.

Therefore, the industry has developed a roller blind with a device for adjusting a suitable upper limit position but not provided with a lower position limiting device, once a force of unfolding the blind downward is too strong, it causes the blind to fall off from the upper rail; on the contrary, for a roller blind provided with only a lower position limiting device but without an upper position limiting device, as the blind is retracted, a bottom of the blind turns over to another side of the upper rail due to a force generated by retraction, so the user has to manually put the lower rail back to its original position.

In addition, please refer to FIG. 3. The industry has developed the roller blind and the buffer of the roller blind of Taiwan patent publication No. M605068 capable of adjusting upper and lower limit positions. The buffer 21 of the roller blind 2 is pre-adjusted with the upper and lower limit positions and fixed in the upper rail 22. Once a customer finds that the size of the roller blind 2 is not suitable after installation, the customer is unable to make adjustment by himself. The customer must send the roller blind 2 back to the seller for adjustment or re-purchase the roller blind 2 with a suitable size. Therefore, those skilled in the art are eager to research and make improvement to solve the above-mentioned problems and drawbacks in the prior art.

SUMMARY OF THE INVENTION

A main object of the invention is to solve the problems derived from the existing roller blind.

In order to achieve the above-mentioned object, the invention provides a roller blind comprising an upper rail having a left side and a right side; a roller blind device located at one end of the upper rail; a position limiting device located at another end of the upper rail; two fixing brackets respectively provided for pivotally connecting with the roller blind device and the position limiting device, and the two fixing brackets provided for fixing at two sides above a window; a lower rail disposed at an interval below the upper rail; and a blind material, two ends of the blind material are respectively fixed on the upper rail and the lower rail, and the blind material is wound on a surface of the upper rail. One end of the position limiting device protrudes from an outer end of the upper rail and is combined with one of the two fixing brackets at the right side, and is also capable of adjusting a lower limit position of the lower rail and an upper limit position of the lower rail from an outer side of the fixing bracket at the right side.

Further, the upper rail is provided with a limiting protrusion. An embedding groove is provided above the limiting protrusion for embedding an initial end of the blind material, so that the blind material is driven by the upper rail to move upward and downward; a surface of the lower rail is provided with an elongated groove, the elongated groove is provided for a terminal end of the blind material to be inserted and fixed therein; one end of the roller blind device is provided with a square fixing post. The position limiting device comprises a lower position limiting shaft, a shaft shell, an upper position limiting shaft, a stroke adjustment member, a position limiting rotational element, an upper position limiting stopper, a lower position limiting stopper, and a position limiting elastic element. The lower position limiting shaft comprises a first protruding shaft located at one end of the lower position limiting shaft and protruding from the fixing bracket at the right side. The first protruding shaft is a square shaft and provided with a through hole communicating with an inner hollow of the lower position limiting shaft. The lower position limiting shaft comprises a top cover connected with the first protruding shaft, and a plurality of fasteners distributed and protruding on another end of the lower position limiting shaft. Each of the plurality of fasteners is provided with a hook. The shaft shell is sleeved on an outer surface of the lower position limiting shaft and combined in the upper rail. The shaft shell is driven by the upper rail to rotate on the outer surface of the lower position limiting shaft. One end of the shaft shell comprises a concave edge. Another end of the shaft shell is extended with an inner shaft with a chamber. The chamber is provided for the lower position limiting shaft to be inserted into. The top cover is correspondingly disposed in the concave edge, and the first protruding shaft rotates and drives the lower position limiting shaft to rotate in the chamber. An outer end of the inner shaft is provided for the plurality of fasteners to abut thereon to restrict the lower position limiting shaft from detaching. The shaft shell comprises at least one first position limiting groove corresponding to the limiting protrusion of the upper rail. The upper position limiting shaft is disposed in the inner hollow of the lower position limiting shaft. The upper position limiting shaft comprises a second protruding shaft and a shaft rod. The second protruding shaft is located at one end of the upper position limiting shaft. The second protruding shaft is a circular protruding shaft to be inserted into the through hole of the first protruding shaft. The second protruding shaft comprises a hexagonal hole. The shaft rod protrudes from an inside of the upper position limiting shaft to another end of the upper position limiting shaft which is provided with a ring groove. An inner chamber is formed between the inside of the end and the shaft rod of the upper position limiting shaft. An outer surface of the shaft rod comprises a first protrusion and a second protrusion. One end of the first protrusion and one end of the second protrusion are connected with the ring groove of the upper position limiting shaft and do not exceed an outer diameter of the ring groove. One end of the stroke adjustment member is inserted into the inner chamber of the upper position limiting shaft and is provided for the shaft rod to rotate therein. The stroke adjustment member comprises an arcuate lever, an annular protrusion connected with the arcuate lever, a first screw thread portion connected with the annular protrusion and protruding toward a direction opposite to the arcuate lever, and a first fixing portion connected with the first screw thread portion. The arcuate lever comprises a semi-circular arcuate groove. The semi-circular arcuate groove is provided for inserting the outer surface of the shaft rod without the first protrusion and the second protrusion and for the shaft rod to rotate therein. Two sides of the arcuate lever respectively form a first rim and a second rim, and an outer surface of the first fixing portion comprises an engaging body. The position limiting rotational element is movably screwed with the stroke adjustment member and combined with the upper rail, and the position limiting rotational element is driven by the upper rail to rotate and move along the stroke adjustment member. The position limiting rotational element comprises a second screw thread portion and at least one second position limiting groove corresponding to the limiting protrusion of the upper rail. The second screw thread portion is correspondingly screwed with the first screw thread portion, and two sides of the position limiting rotational element are respectively provided with a first abutting portion and a second abutting portion adjacent to the second position limiting groove. The upper position limiting stopper is connected with another end of the stroke adjustment member and rotates synchronously with the stroke adjustment member. The upper position limiting stopper includes a second fixing portion and a third abutting portion. The second fixing portion is combined with the first fixing portion of the stroke adjustment member, and the third abutting portion is correspondingly abutting with the first abutting portion of the position limiting rotational element. The lower position limiting stopper is sleeved on an outer surface of the stroke adjustment member to provide the stroke adjustment member to rotate and move thereon. The lower position limiting stopper comprises a cylinder, a protruding flange, and a fourth abutting portion. The cylinder is sleeved on the outer surface of the stroke adjustment member. The cylinder comprises an accommodating portion. The accommodating portion comprises a first space, a second space communicating with the first space, a third space communicating with the second space, and a third screw thread portion located on an inner surface of the third space from one end to another end of the cylinder. The first space is embedded with the ring groove of the upper position limiting shaft. The inner diameter of the first space is larger than the inner diameter of the second space. The first space and the second space are provided for inserting the arcuate lever of the stroke adjustment member. The first abutting side is formed between the first space and the second space. The inner diameter of the second space is larger than the inner diameter of the third space. The second abutting side is formed between the second space and the third space, and the second abutting side is provided for abutting with the annular protrusion of the stroke adjustment member. The third screw thread portion is movably screwed with the first screw thread portion of the stroke adjustment member. The outer surface of the end of the cylinder comprises a plurality of grooves. The protruding flange protrudes on the cylinder and is disposed adjacent to the grooves. The protruding flange comprises a plurality of embedding grooves corresponding to the grooves. The plurality of embedding grooves is provided for the hooks of the plurality of fasteners to insert through and hook thereon from the grooves, so that the protruding flange abuts the outer end of the inner shaft, and the lower position limiting stopper is combined with the lower position limiting shaft. The fourth abutting portion protrudes toward the outer surface of the cylinder. One end of the fourth abutting portion is connected with the protruding flange, another end of the fourth abutting portion extends to pass the other end of the cylinder, and the fourth abutting portion is correspondingly abutting with the second abutting portion of the position limiting rotational element. The position limiting elastic element is located in the first space of the lower position limiting stopper. One end of the position limiting elastic element abuts on the first abutting side, and another end of the position limiting elastic element abuts on the other end of the upper position limiting shaft. A first inserting space and a second inserting space are formed through the end and the other end of the position limiting elastic element. The first inserting space is provided for the arcuate lever to insert into and rotate in a counterclockwise or a clockwise direction. The second inserting space is provided for the first protrusion and the second protrusion of the shaft rod to insert into and rotate in a counterclockwise or a clockwise direction.

Further, each of the fixing brackets comprises a fixing body and a vertical stand connected below the fixing body. Each of the fixing bodies comprises an L-shaped member. Each of the L-shaped members comprises a plurality of fixing holes disposed in a horizontal part and a longitudinal part respectively. Lower portions of the L-shaped members where the fixing holes in the longitudinal part disposed bends toward the inside. The vertical stands are respectively provided with a connecting portion connecting with a bottom end of the longitudinal part of each of the L-shaped members, and a guiding portion extending from below the connecting portion. Two grooves are respectively provided on two sides of each of the guiding portions for temporarily placing the roller blind device thereon during installation. A square through hole is provided between the grooves of each of the guiding portions for inserting and positioning the fixing post of the roller blind device and the first protruding shaft of the lower position limiting shaft. A guiding groove bent toward the outside is provided below each of the through holes of each of the guiding portions. One of the guiding grooves is provided for guiding the fixing post into one of the through holes for positioning, and the other guiding groove is provided for guiding the first protruding shaft into the other through hole for positioning.

Further, each of the fixing brackets further comprises an outer cover. Each of the outer cover is provided with an accommodating groove. Two locking blocks are respectively located on two sides of the upper part of the accommodating grooves. Each of the accommodating grooves is provided for embedding the vertical stands. Each of the connecting portions is fixed by the locking blocks.

Further, there are three of the plurality of fasteners; wherein three of the plurality of grooves of the cylinder and three of the plurality of embedding grooves of the protruding flange are correspondingly disposed to match with the three of the plurality of fasteners.

Further, the first abutting portion, the second abutting portion, and the third abutting portion are protrusions, and the fourth abutting portion is a protruding strip.

Through the foregoing implementation of the invention, compared with the prior art, the roller blind of the invention includes the following features: through the position limiting device, a user is capable of conveniently rotating one end of the position limiting device manually without disassembling the entire set of the roller blind, so that the lower rail is restricted and controlled not to continue to be lowered and is limited by a lower limit position. Or, an adjustment tool is used to adjust the position limiting device to restrict and control the lower rail not to continue to be pulled up and to be limited by an upper limit position.

DETAILED DESCRIPTION OF THE PREFERRED EMBODIMENTS

Figure 2:
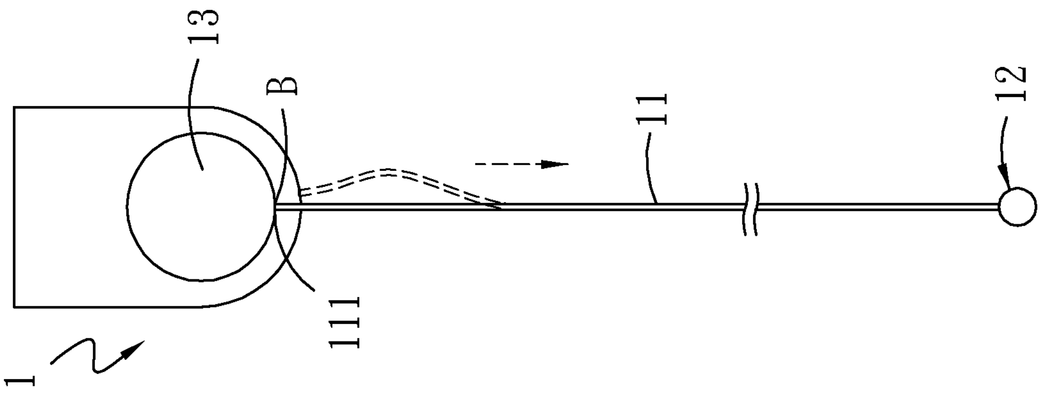
Fig. 2 PRIOR ART
FIG. 2 is a schematic diagram of a conventional roller blind as the blind material being unfolded.
Figure 1:
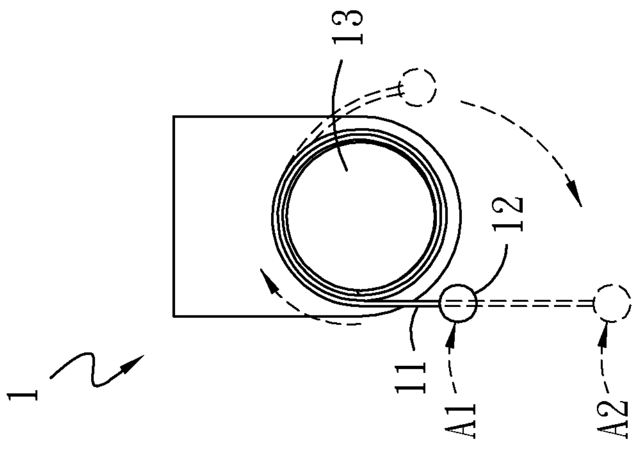
Fig. 1 PRIOR ART
FIG. 1 is a schematic diagram of a conventional roller blind as the blind material being folded.
Figure 3:
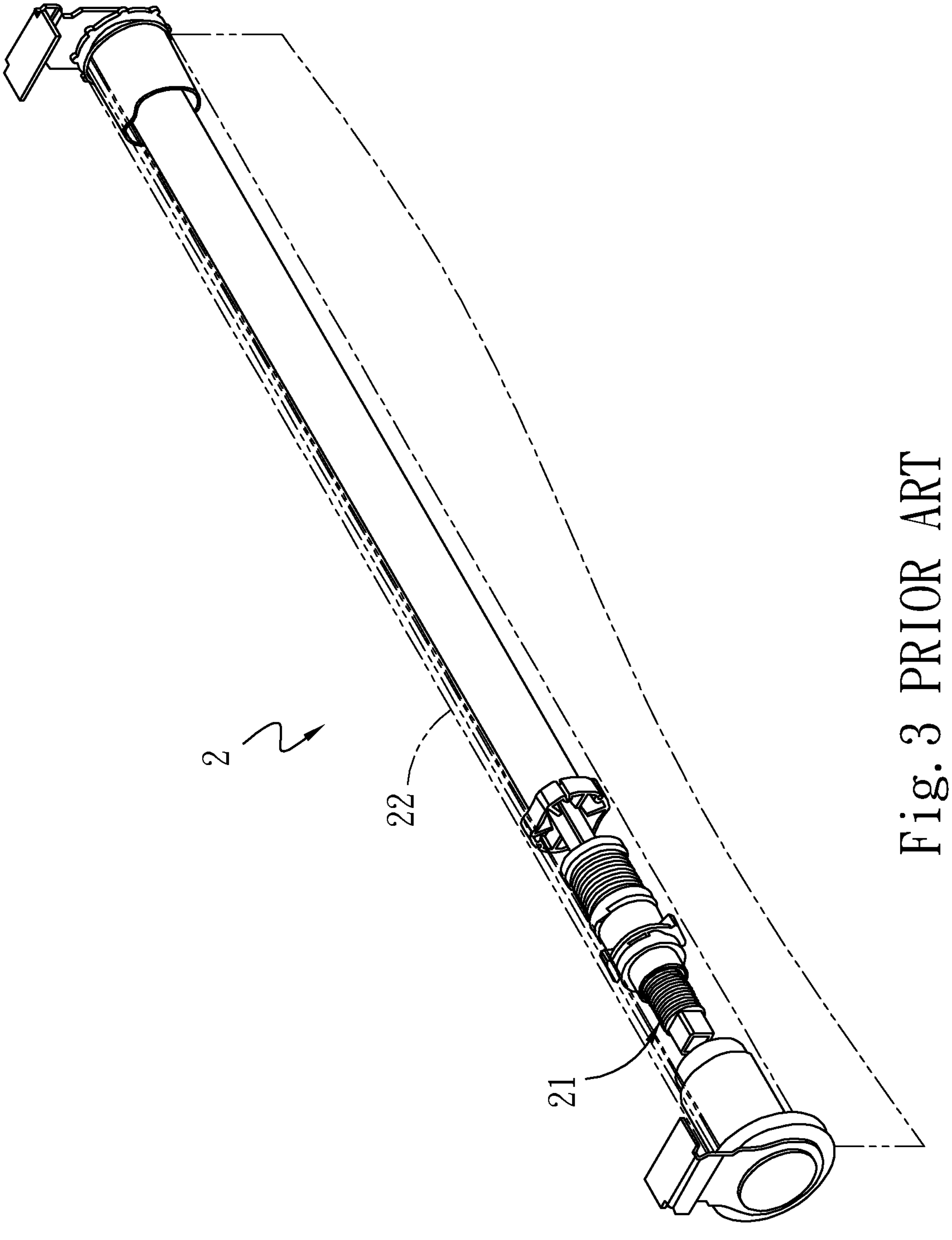
Fig. 3 PRIOR ART
FIG. 3 is an arrangement drawing of the roller blind and the buffer of the roller blind of Taiwan patent publication No. M605068 capable of adjusting upper and lower limit positions.
Figure 4:
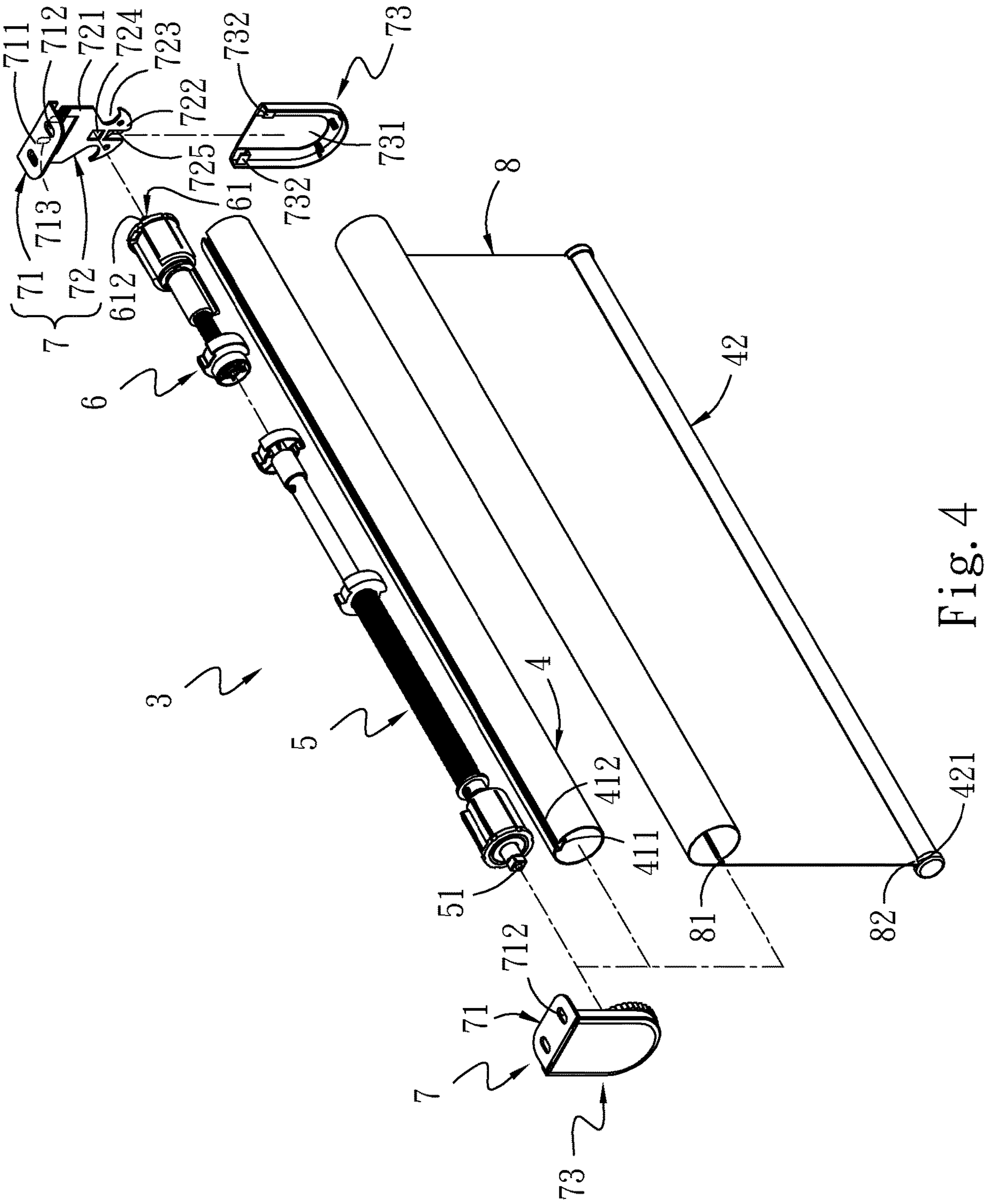
FIG. 4 is an exploded perspective view of a roller blind of the invention.
Figure 5:
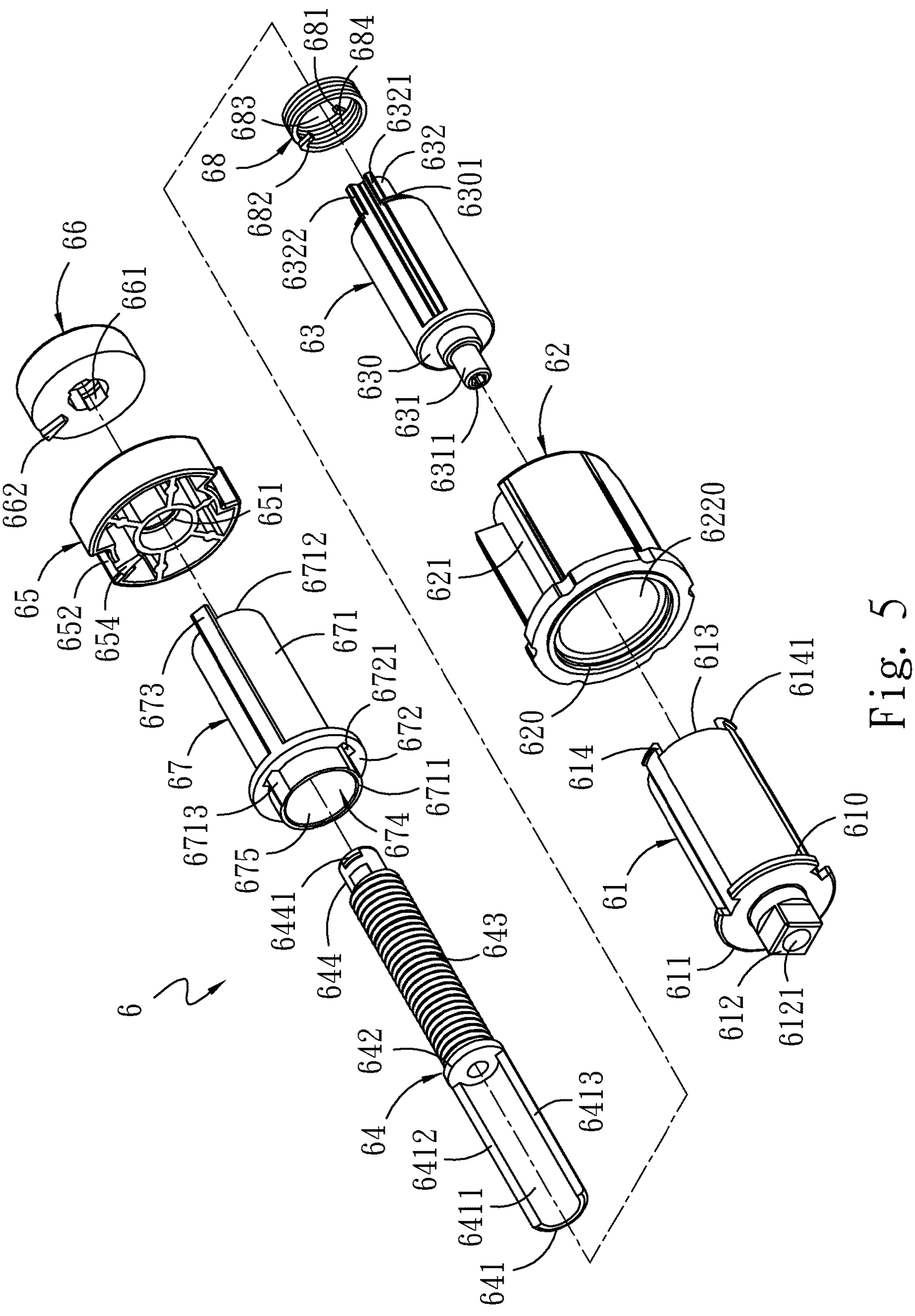
FIG. 5 is an exploded perspective view of a position limiting device of the roller blind of the invention.
Figure 6:
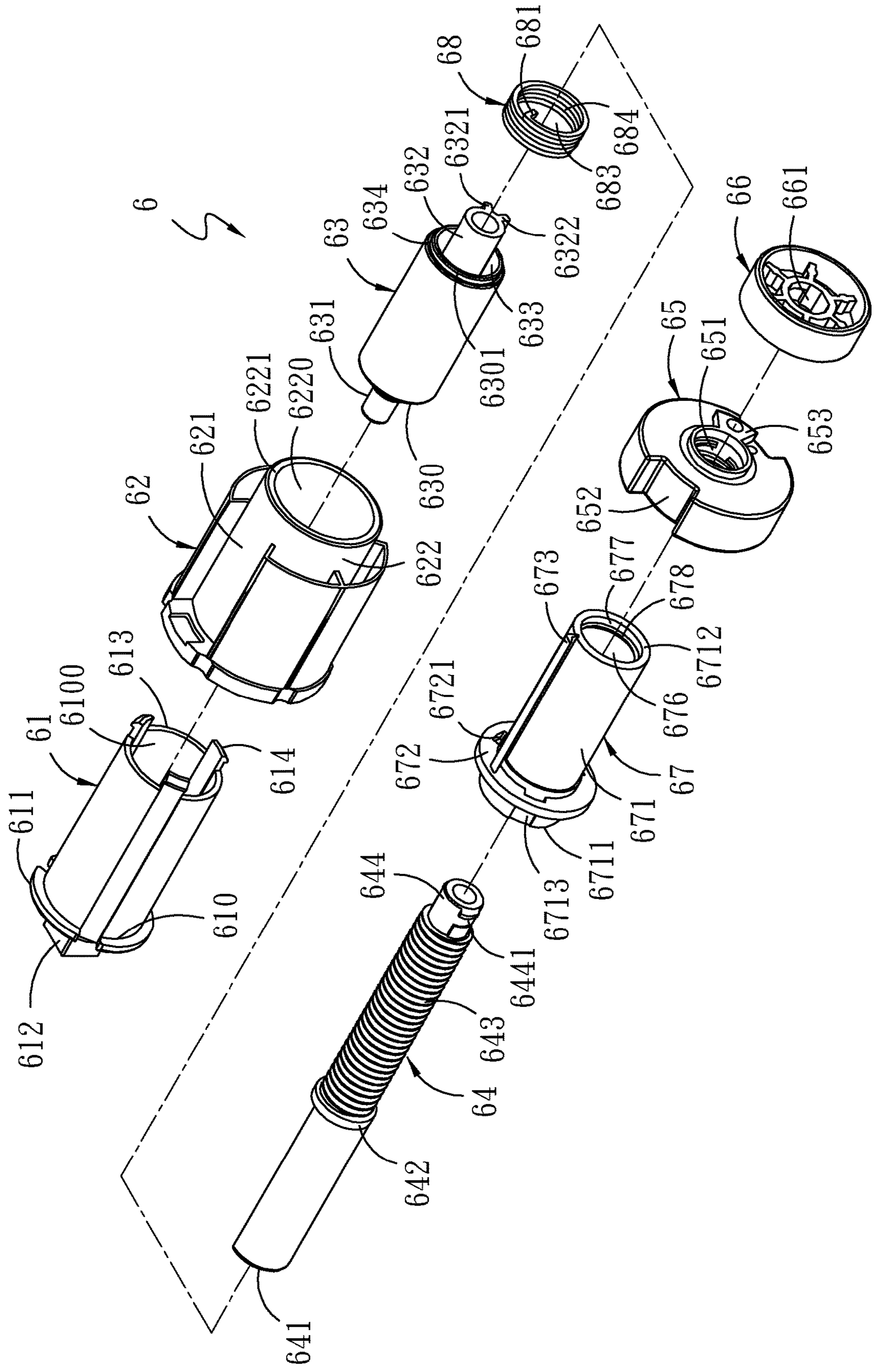
FIG. 6 is an exploded perspective view of the position limiting device of the roller blind in FIG. 5 being viewed from another angle.

The detailed description and technical contents of the invention are described below with reference to the drawings.

Please refer to FIG. 4, FIG. 5, FIG. 6, and FIG. 7. The invention provides a roller blind. A roller blind 3 comprises an upper rail 4, a roller blind device 5 located at one end of the upper rail 4, a position limiting device 6 located at another end of the upper rail 4, two fixing brackets 7 respectively provided for pivotally connecting with the roller blind device 5 and the position limiting device 6, a lower rail 42 disposed at an interval below the upper rail 4, and a blind material 8. The upper rail 4 is provided with a limiting protrusion 411. An embedding groove 412 is provided above the limiting protrusion 411 for embedding an initial end 81 of the blind material 8. The initial end 81 of the blind material 8 is wound on a surface of the upper rail 4, so that the blind material 8 is driven by the upper rail 4 to move upward and downward. A surface of the lower rail 42 is provided with an elongated groove 421, the elongated groove is provided for a terminal end 82 of the blind material 8 to be inserted and fixed therein.

The roller blind device 5 is disposed at one end of the upper rail 4 which is provided with a square fixing post 51. The fixing post 51 is pivotally connected to the fixed bracket 7 at a left side. The roller blind device 5 is a conventional component, so it will not be repeated here.

Please refer FIG. 4, FIG. 5, FIG. 6, and FIG. 7. The position limiting device 6 is disposed at the other end of the upper rail 4. The position limiting device 6 comprises a lower position limiting shaft 61, a shaft shell 62, an upper position limiting shaft 63, a stroke adjustment member 64, a position limiting rotational element 65, a upper position limiting stopper 66, a lower position limiting stopper 67, and a position limiting elastic element 68. The lower position limiting shaft 61 comprises a first protruding shaft 612 located at one end 610 of the lower position limiting shaft 61 and protruding from one of the two fixing brackets 7 at the right side. The first protruding shaft 612 is a square shaft so that the first protruding shaft 612 is incapable of shifting. In one embodiment, the first protruding shaft 612 is provided with a through hole 6121 communicating with an inner hollow 6100 of the lower position limiting shaft 61. The lower position limiting shaft 61 comprises a top cover 611 connected with the first protruding shaft 612, and a plurality of fasteners 614 distributed and protruding on another end 613 of the lower position limiting shaft 61. The total number of the fasteners 614 in a preferable embodiment is three. Each of the plurality of fasteners 614 is provided with a hook 6141.

The shaft shell 62 is sleeved on an outer surface of the lower position limiting shaft 61 and combined in the upper rail 4. The shaft shell 62 is driven by the upper rail 4 to rotate on the outer surface of the lower position limiting shaft 61. One end of the shaft shell 62 comprises a concave edge 620. Another end of the shaft shell 62 is extended with an inner shaft 622 with a chamber 6220. The chamber 6220 is provided for the lower position limiting shaft 61 to be inserted into. The top cover 611 is correspondingly disposed in the concave edge 620, and the first protruding shaft 612 rotates and drives the lower position limiting shaft 61 to rotate in the chamber 6220. An outer end 6221 of the inner shaft 622 is provided for the plurality of fasteners 614 to abut thereon to restrict the lower position limiting shaft 61 from detaching. The shaft shell 62 comprises at least one first position limiting groove 621 corresponding to the limiting protrusion 411 of the upper rail 4, so that the upper rail 4 is capable of driving the shaft shell 62 to rotate on the outer surface of the lower position limiting shaft 61 in harmony with the limiting protrusion 411 of the upper rail 4.

Figure 18:
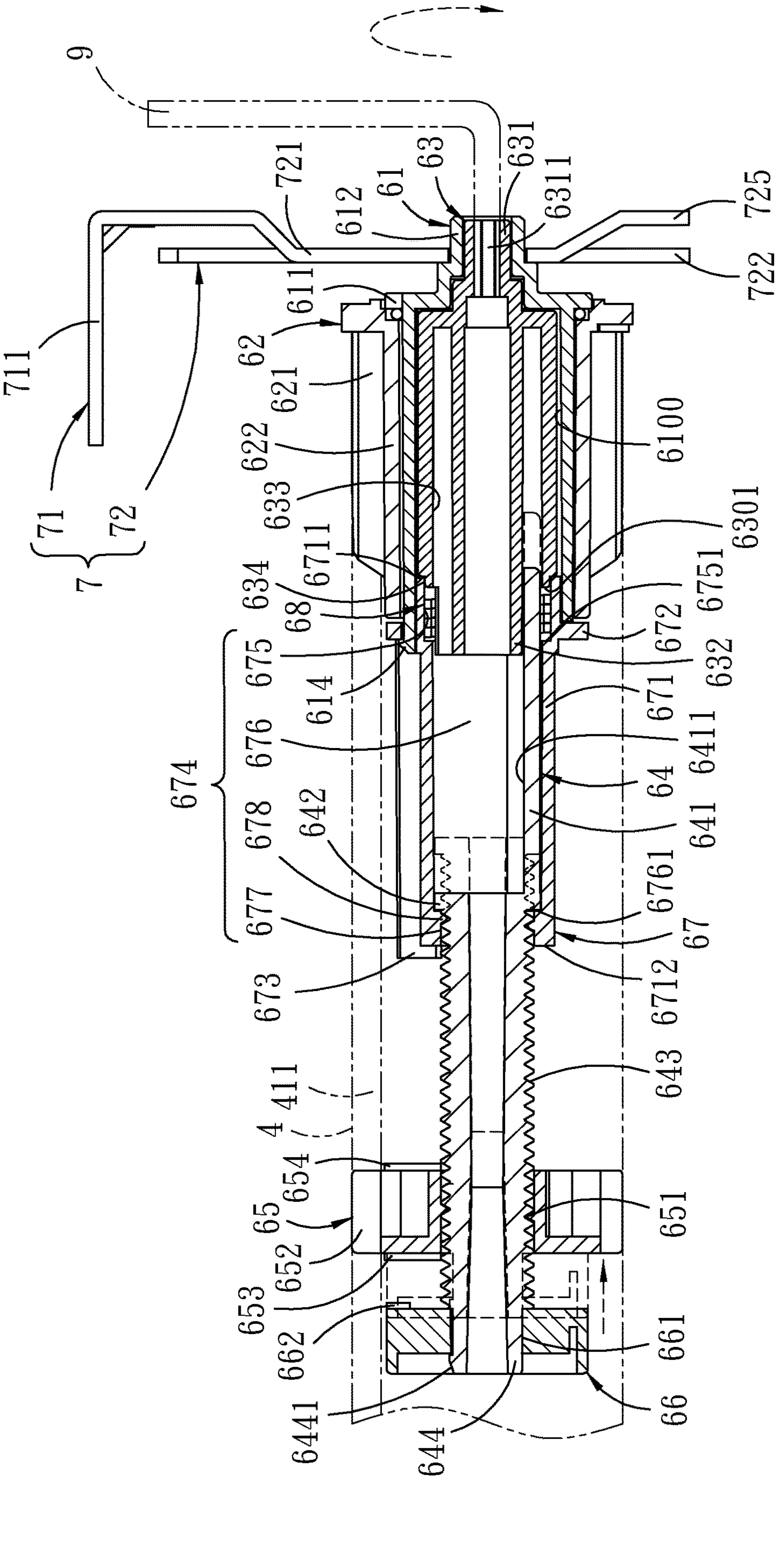
FIG. 18 is a cross-sectional view of the position limiting device in FIG. 17 being actuated for changing an upper limit position of the lower rail.

The upper position limiting shaft 63 is disposed in the inner hollow 6100 of the lower position limiting shaft 61. The upper position limiting shaft 63 comprises a second protruding shaft 631 and a shaft rod 632. The second protruding shaft 631 is located at one end 630 of the upper position limiting shaft 63. The second protruding shaft 631 is a circular protruding shaft to be inserted into the through hole 6121 of the first protruding shaft 612. The second protruding shaft 631 comprises a hexagonal hole 6311, and the hexagonal hole 6311 is provided for inserting an adjustment tool 9 such as a hexagon wrench to rotate the upper position limiting shaft 63 in the inner hollow 6100 of the lower position limiting shaft 61 (as shown in FIG. 18). The shaft rod 632 protrudes from an inside of the upper position limiting shaft 63 to another end 6301 of the upper position limiting shaft 63 which is provided with a ring groove 634. An inner chamber 633 is formed between the inside of the end 6301 and the shaft rod 632 of the upper position limiting shaft 63. An outer surface of the shaft rod 632 comprises a first protrusion 6321 and a second protrusion 6322. One end of the first protrusion 6321 and one end of the second protrusion 6322 are connected with the ring groove 634 of the upper position limiting shaft 63 and do not exceed an outer diameter of the ring groove 634.

One end of the stroke adjustment member 64 is inserted into the inner chamber 633 of the upper position limiting shaft 63 and is provided for the shaft rod 632 to rotate therein. The stroke adjustment member 64 comprises an arcuate lever 641, an annular protrusion 642, a first screw thread portion 643, and a first fixing portion 644. The arcuate lever 641 is in a semi-circular arcuate shape and comprises a semi-circular arcuate groove 6411 which is provided for inserting the outer surface of the shaft rod 632 without the first protrusion 6321 and the second protrusion 6322 and for the shaft rod 632 to rotate therein. Two sides of the arcuate lever 641 respectively form a first rim 6412 and a second rim 6413. The annular protrusion 642 is connected with the arcuate lever 641. The first screw thread portion 643 is connected with the annular protrusion 642 and protrudes toward a direction opposite to the arcuate lever 641. The first fixing portion 644 is connected with the first screw thread portion 643. The outer surface of the first fixing portion 644 comprises an engaging body 6441.

The position limiting rotational element 65 is movably screwed with the stroke adjustment member 64 and combined with the upper rail 4, and the position limiting rotational element 65 is driven by the upper rail 4 to rotate and move along the stroke adjustment member 64. The position limiting rotational element 65 comprises a second screw thread portion 651 and at least one second position limiting groove 652. The second screw thread portion 651 is correspondingly screwed with the first screw thread portion 643. The second position limiting groove 652 corresponds to the limiting protrusion 411 of the upper rail 4, so that the upper rail 4 is capable of driving the position limiting rotational element 65 to rotate and move along the first screw thread portion 643 in harmony with the limiting protrusion 411 of the upper rail 4. Two sides of the position limiting rotational element 65 are respectively provided with a first abutting portion 653 and a second abutting portion 654 adjacent to the second position limiting groove 652.

Please refer to FIG. 7, FIG. 8, FIG. 9, FIG. 10, FIG. 11, FIG. 12, and FIG. 13. The upper position limiting stopper 66 is connected with another end of the stroke adjustment member 64 and rotates synchronously with the stroke adjustment member 64. The upper position limiting stopper 66 includes a second fixing portion 661 and a third abutting portion 662. The second fixing portion 661 is combined with the first fixing portion 644 of the stroke adjustment member 64, and the third abutting portion 662 is correspondingly abutting with the first abutting portion 653 of the position limiting rotational element 65.

Figure 7:
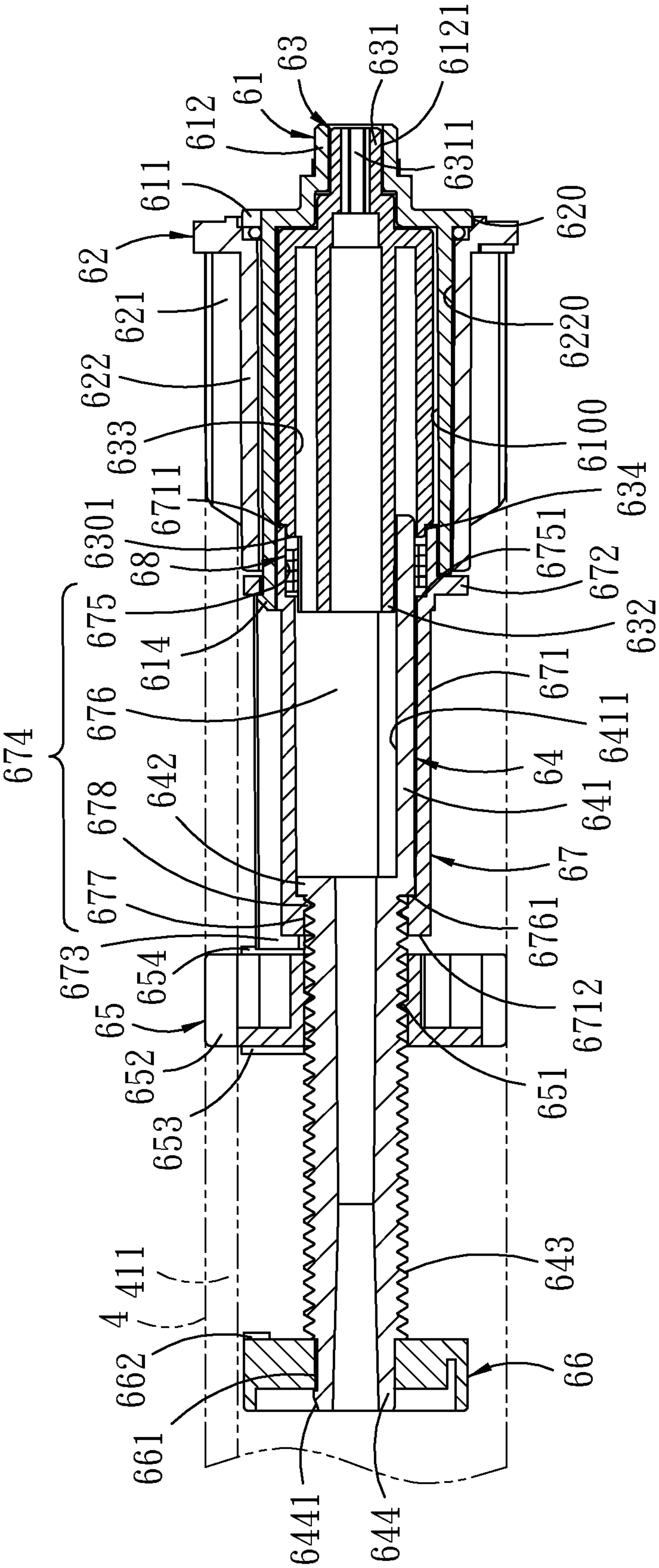
FIG. 7 is an assembled cross-sectional view of the position limiting device of the roller blind in FIG. 5.
Figure 8:
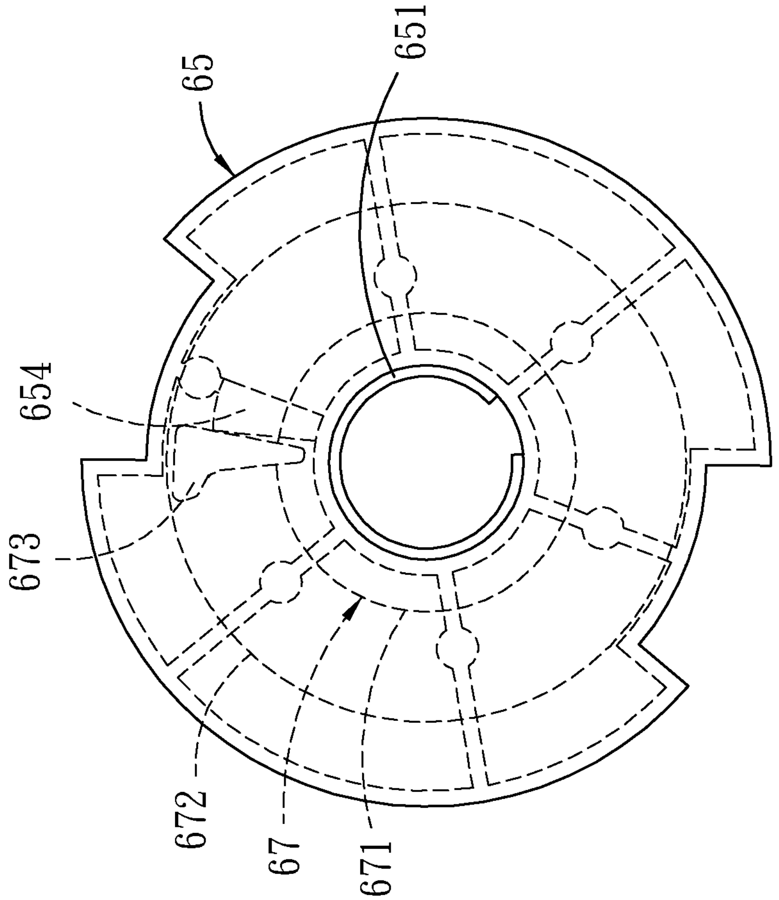
FIG. 8 is a side view of a second abutting portion abutting with a fourth abutting portion in FIG. 7.

Please refer to FIG. 7 and FIG. 8. The lower position limiting stopper 67 is sleeved on an outer surface of the stroke adjustment member 64 to provide the stroke adjustment member 64 to rotate and move thereon. The lower position limiting stopper 67 comprises a cylinder 671, a protruding flange 672, and a fourth abutting portion 673. The cylinder 671 is sleeved on the outer surface of the stroke adjustment member 64. The cylinder 671 comprises an accommodating portion 674. The accommodating portion 674 comprises a first space 675, a second space 676 communicating with the first space 675, a third space 677 communicating with the second space 676, and a third screw thread portion 678 located on an inner surface of the third space 677 from one end to another end of the cylinder. The first space 675 is embedded with the ring groove 634 of the upper position limiting shaft 63. The inner diameter of the first space 675 is larger than the inner diameter of the second space 676. The first space 675 and the second space 676 are provided for inserting the arcuate lever 641 of the stroke adjustment member 64. The first abutting side 6751 is formed between the first space 675 and the second space 676. The inner diameter of the second space 676 is larger than the inner diameter of the third space 677. The second abutting side 6761 is formed between the second space 676 and the third space 677, and the second abutting side 6761 is provided for abutting with the annular protrusion 642 of the stroke adjustment member 64. The third screw thread portion 678 is movably screwed with the first screw thread portion 643 of the stroke adjustment member 64. The outer surface of the end 6711 of the cylinder 671 comprises a plurality of grooves 6713. The protruding flange 672 protrudes on the cylinder 671 and is disposed adjacent to the grooves 6713. The protruding flange 672 comprises a plurality of embedding grooves 6721 corresponding to the grooves 6713. The plurality of embedding grooves 6721 is provided for the hooks of the plurality of fasteners 614 to insert through and hook thereon from the grooves 6713, so that the protruding flange 672 abuts the outer end of the inner shaft 622, and the lower position limiting stopper 67 is combined with the lower position limiting shaft 61. Three of the grooves 6713 of the cylinder 671 and three of the embedding grooves 6721 of the protruding flange 672 are correspondingly disposed to match with the three fasteners 614. The fourth abutting portion 673 protrudes toward the outer surface of the cylinder 671. One end of the fourth abutting portion 673 is connected with the protruding flange 672, another end of the fourth abutting portion 673 extends to pass the other end 6712 of the cylinder 671, and the fourth abutting portion 673 is correspondingly abutting with the second abutting portion 654 of the position limiting rotational element 65. In one embodiment, the first abutting portion 653, the second abutting portion 654, and the third abutting portion 662 are protrusions, and the fourth abutting portion 673 is a protruding strip.

Figure 9:
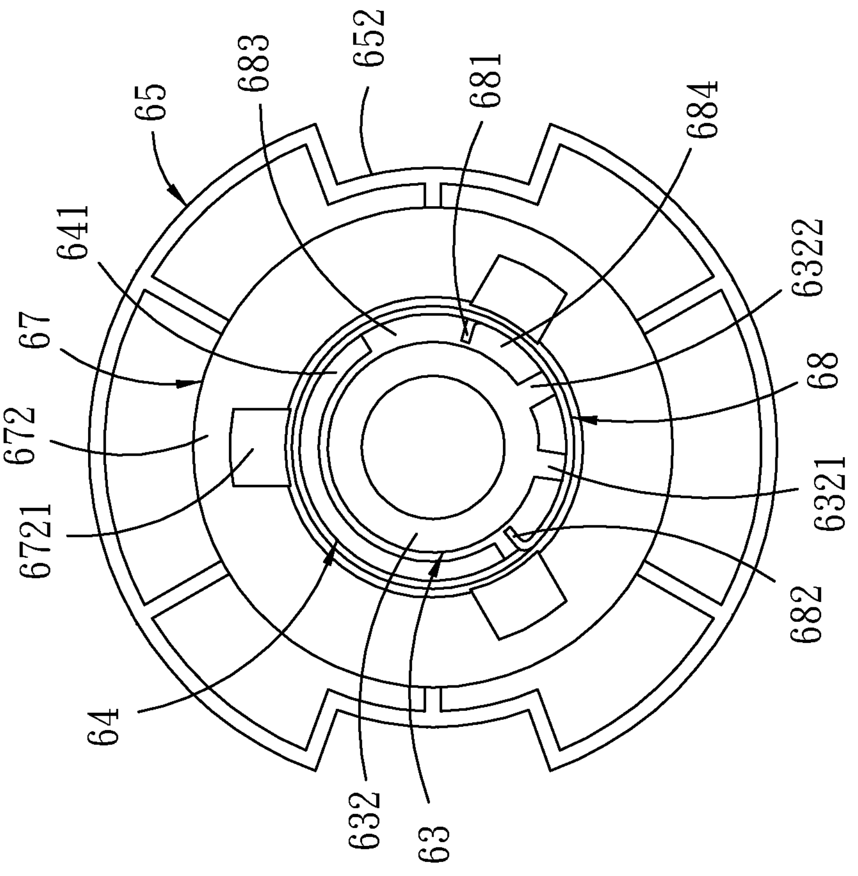
FIG. 9 is a side view of assembly of a stroke adjustment member, a position limiting elastic element and a lower position limiting stopper in FIG. 5.
Figure 10:
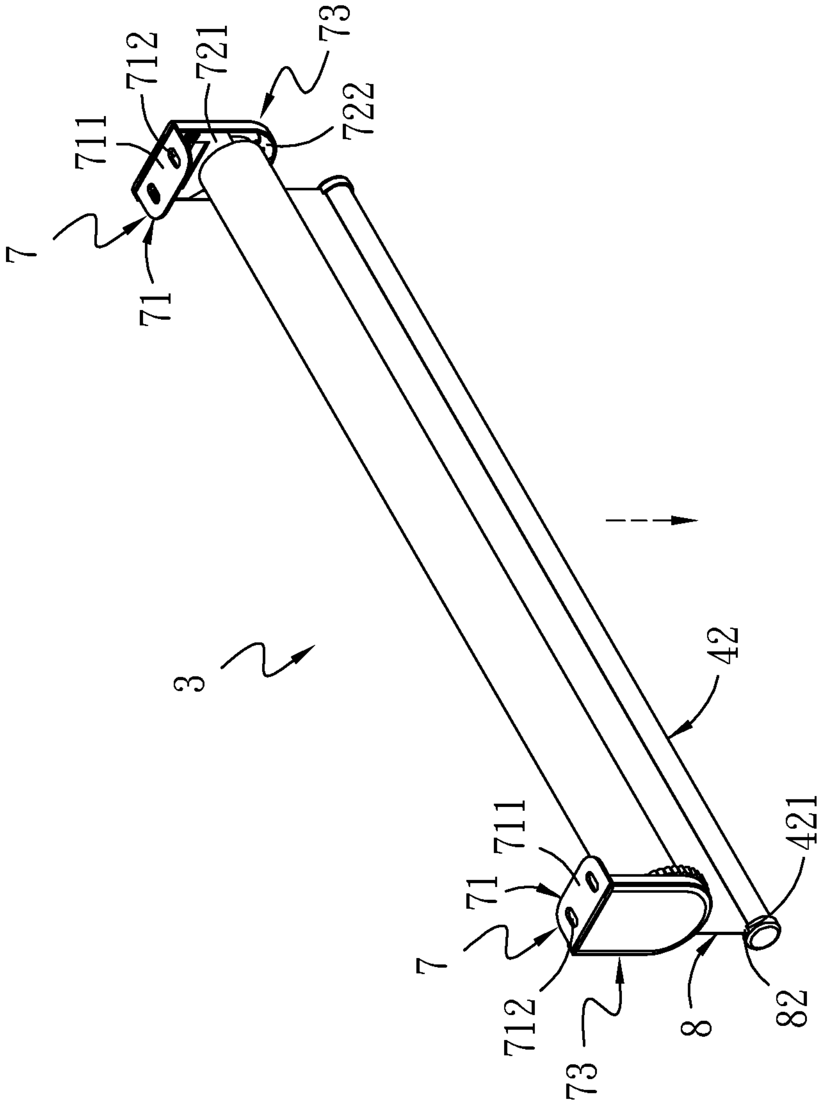
FIG. 10 is a perspective view of a blind material of the roller blind of the invention being pulled downward.
Figure 11:
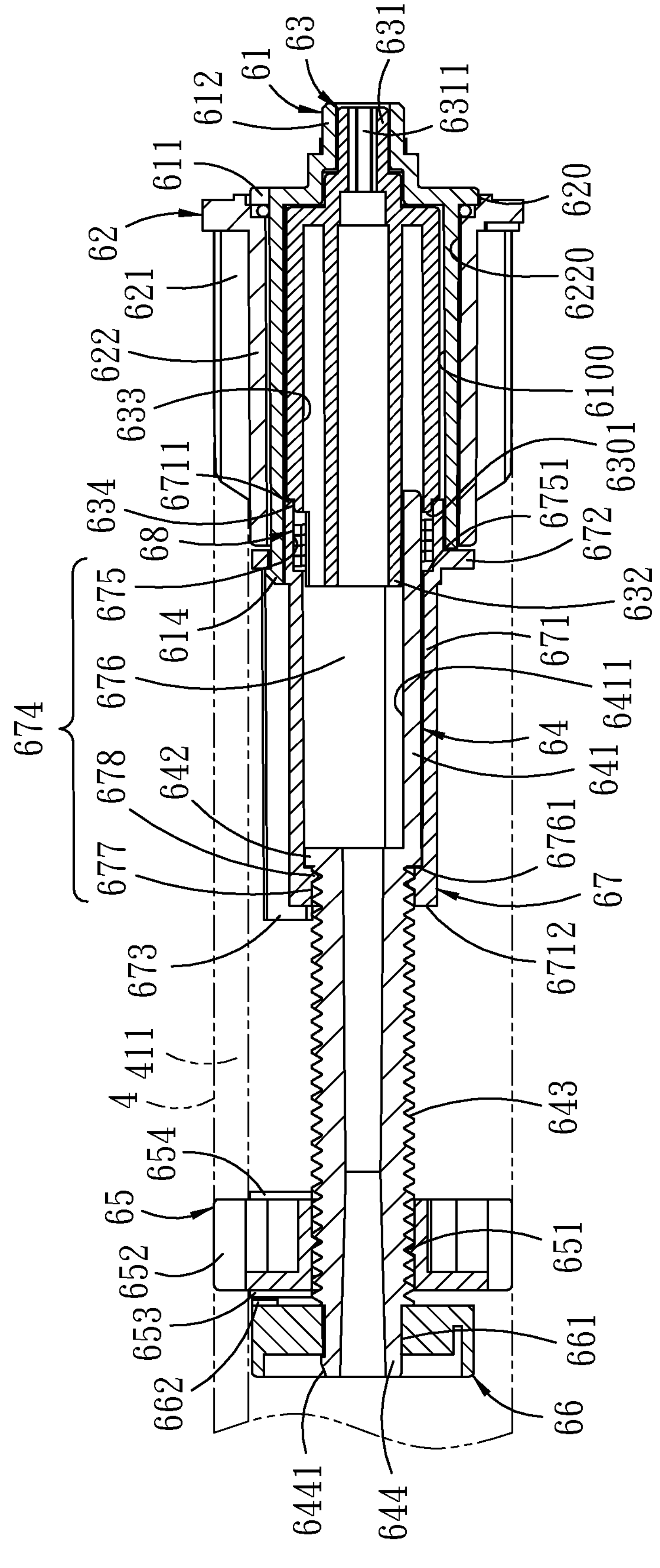
FIG. 11 is an assembled cross-sectional view of the position limiting device of the roller blind in FIG. 10.
Figure 12:
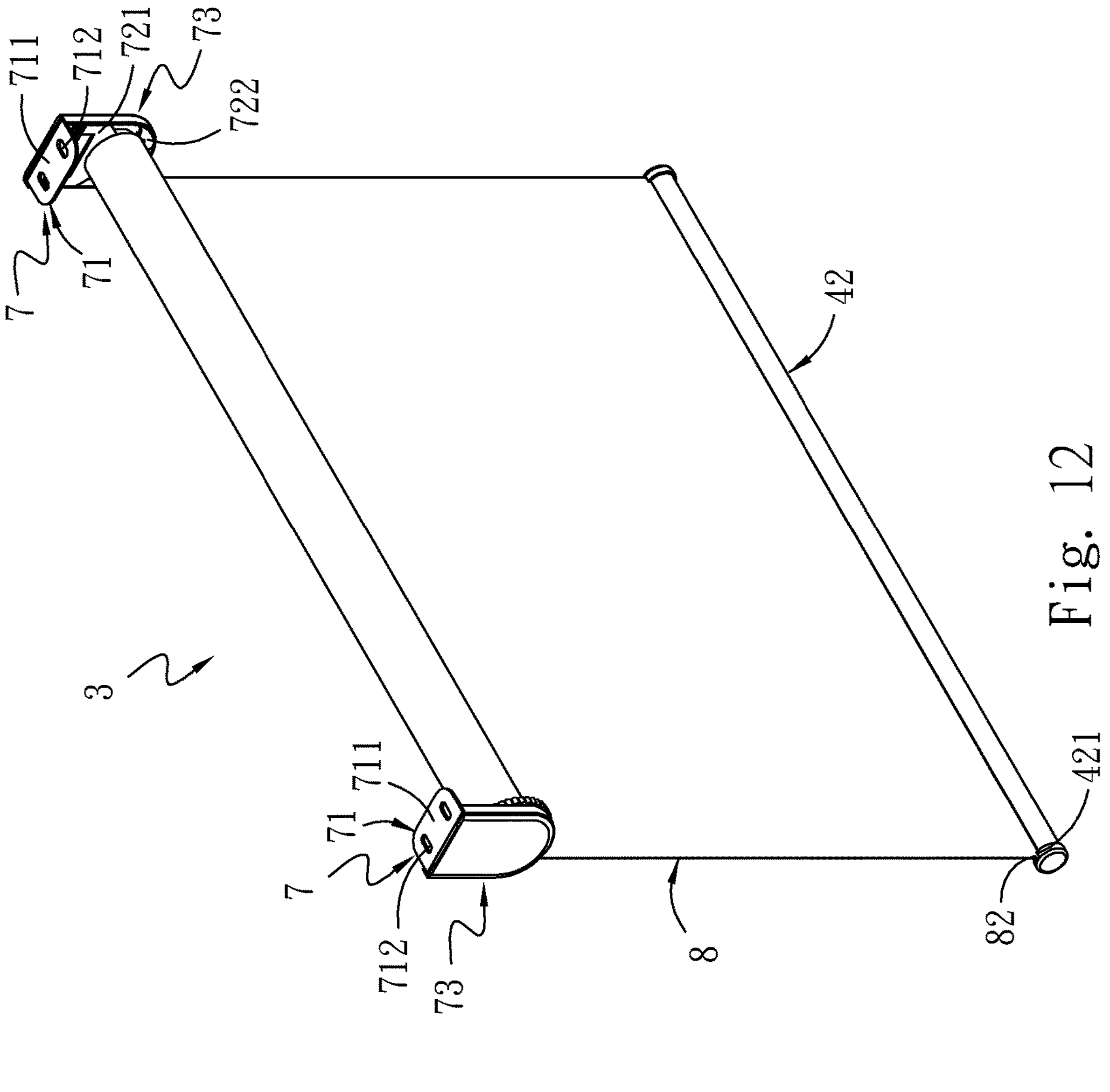
FIG. 12 is a perspective view of the blind material of FIG. 10 after unfolding.

Please refer to FIG. 7, FIG. 8, and FIG. 9 in conjunction with FIG. 16, FIG. 17, FIG. 18, and FIG. 19. The position limiting elastic element 68 is located in the first space 675 of the lower position limiting stopper 67. One end 681 of the position limiting elastic element 68 abuts on the first abutting side 6751, and another end 682 of the position limiting elastic element 68 abuts on the other end 6301 of the upper position limiting shaft 63. A first inserting space 683 and a second inserting space 684 are formed through the end 681 and the other end 682 of the position limiting elastic element 68. The first inserting space 683 is provided for the arcuate lever 641 to insert into and rotate in a counterclockwise or a clockwise direction. The second inserting space 684 is provided for the first protrusion 6321 and the second protrusion 6322 of the shaft rod 632 to insert into and rotate in a counterclockwise or a clockwise direction.

Please refer to FIG. 4 again. The fixing brackets 7 are fixed at two sides above a window. Each of the fixing brackets 7 comprises a fixing body 71 installed at a side above a window, and a vertical stand 72 connected below the fixing body 71. Each of the fixing bodies 71 comprises an L-shaped member 711. Each of the L-shaped members 711 comprises a plurality of fixing holes 712, 713 disposed in a horizontal part and a longitudinal part respectively. Lower portions of the L-shaped members 711 where the fixing holes 712, 713 in the longitudinal part disposed bends toward the inside. The vertical stands 72 are respectively provided with a connecting portion 721 connecting with a bottom end of the longitudinal part of each of the L-shaped members 711, and a guiding portion 722 extending from below the connecting portion 721. Two grooves 723 are respectively provided on two sides of each of the guiding portions 722 for temporarily placing the roller blind device 5 thereon during installation. A square through hole 724 is provided between the grooves 723 of each of the guiding portions 722 for inserting and positioning the fixing post 51 of the roller blind device 5 and the first protruding shaft 612 of the lower position limiting shaft 61. A guiding groove 725 bent toward the outside is provided below each of the through holes 724 of each of the guiding portions 722. One of the guiding grooves 725 is provided for guiding the fixing post 51 into one of the through holes 724 for positioning, and the other guiding groove 725 is provided for guiding the first protruding shaft 612 into the other through hole 724 for positioning.

Each of the fixing brackets 7 further comprises an outer cover 73. Each of the outer cover 73 is provided with an accommodating groove 731. Two locking blocks 732 are respectively located on two sides of the upper part of each of the accommodating grooves 731. Each of the accommodating grooves 731 is provided for embedding the vertical stands 72. Each of the connecting portions 721 is fixed by the locking blocks 732.

Please refer to FIG. 10, FIG. 11, FIG. 12, and FIG. 13. As an installer completes the installation of the roller blind 3, the upper rail 4 is rotated to lower the lower rail 42 downward. The upper rail 4 is capable of driving the first position limiting groove 621 of the shaft shell 62 and the second position limiting groove 652 of the position limiting rotational element 65 to rotate along the limiting protrusion 411, and the position limiting rotational element 65 rotates and moves from the stroke adjustment member 64 toward the upper position limiting stopper 66. When the position limiting rotational element 65 abuts against the upper position limiting stopper 66, the first abutting portion 653 of the position limiting rotational element 65 abuts with the third abutting portion 662 of the upper position limiting stopper 66, so that the position limiting rotational element 65 is blocked by the upper position limiting stopper 66 and is incapable of continuing rotating and moving.

Figure 14:
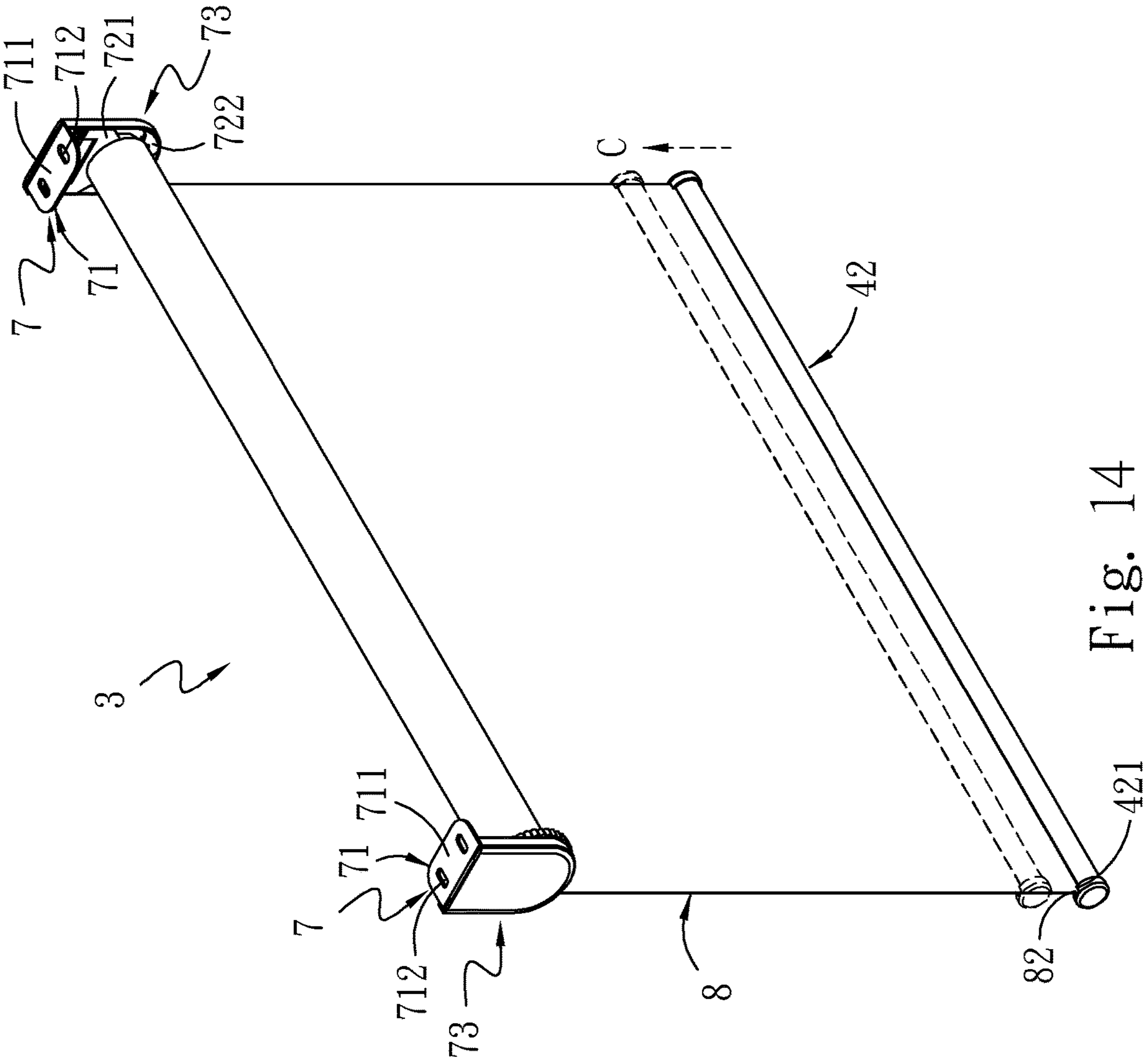
FIG. 14 is a perspective view of changing a lower limit position of a lower rail of the roller blind of the invention.
Figure 15:
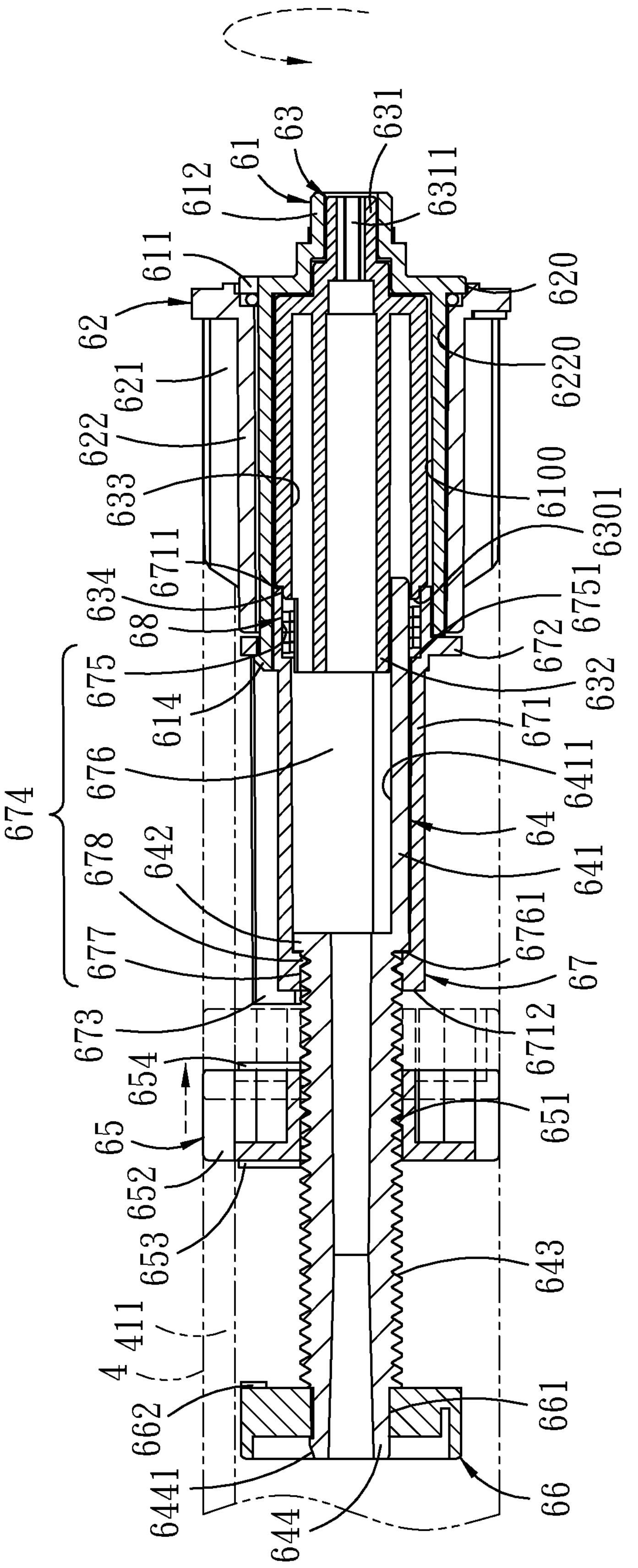
FIG. 15 is a cross-sectional view of the position limiting device in FIG. 14 being actuated for changing a lower limit position of the lower rail.
Figure 16:
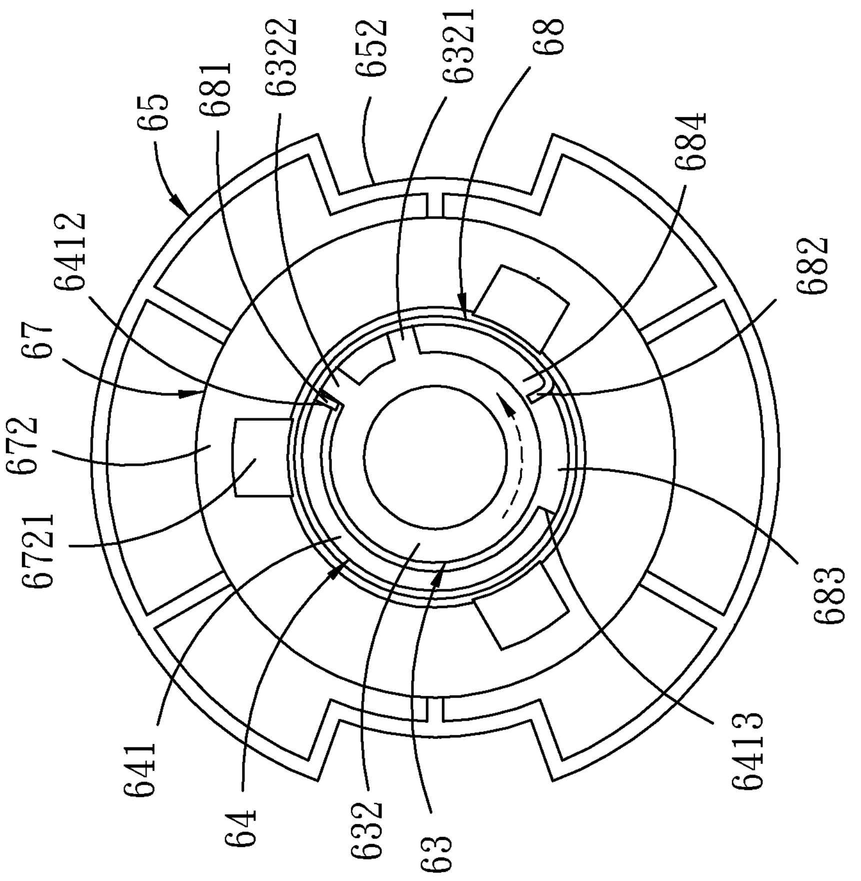
FIG. 16 is a schematic diagram of the stroke adjustment member, the position limiting elastic element and the lower position limiting stopper in FIG. 15 rotating counterclockwise.

Please refer to FIG. 14, FIG. 15, and FIG. 16 in conjunction with FIG. 8. After the roller blind 3 is installed, if a customer finds that the lower limit position of the lower rail 42 of the roller blind 3 is not aligned with a window in the home, and wants to change a lower limit position of lowering the lower rail 42, the customer simply lifts the lower rail 42 to a stop point C of the lower limit position manually, removes one of the two fixing brackets 7 at the right end, detaches the first protruding shaft 612 from the other through hole 724 and tilts the other end of the upper rail 4 installed with the position limiting device 6 downward, so that the shaft shell 62 and the position limiting rotational element 65 are engaged in the upper rail 4 and incapable of rotating. As the customer rotates the first protruding shaft 612 counterclockwise manually, the second protrusion 6322 of the shaft rod 632 rotates and pushes the end 681 of the position limiting elastic element 68 and simultaneously pushes the first rim 6412 of the arcuate lever 641 to drive the arcuate lever 641 to rotate. The upper position limiting shaft 63, the stroke adjustment member 64, the upper position limiting stopper 66 and the lower position limiting stopper 67 disposed inside the shaft shell 62 then rotate counterclockwise as the lower position limiting shaft 61 rotates. The position limiting rotational element 65 is caused to move linearly in a direction toward the lower position limiting stopper 67 until the second abutting portion 654 of the position limiting rotational element 65 abuts with the fourth abutting portion 673 of the lower position limiting stopper 67, the result is that an adjustment of the stop point C of the lower limit position of the lower rail 42 is achieved, and the adjusted lower limit position is the position the upper rail 4 stops lowering the lower rail 42 downward.

Figure 13:
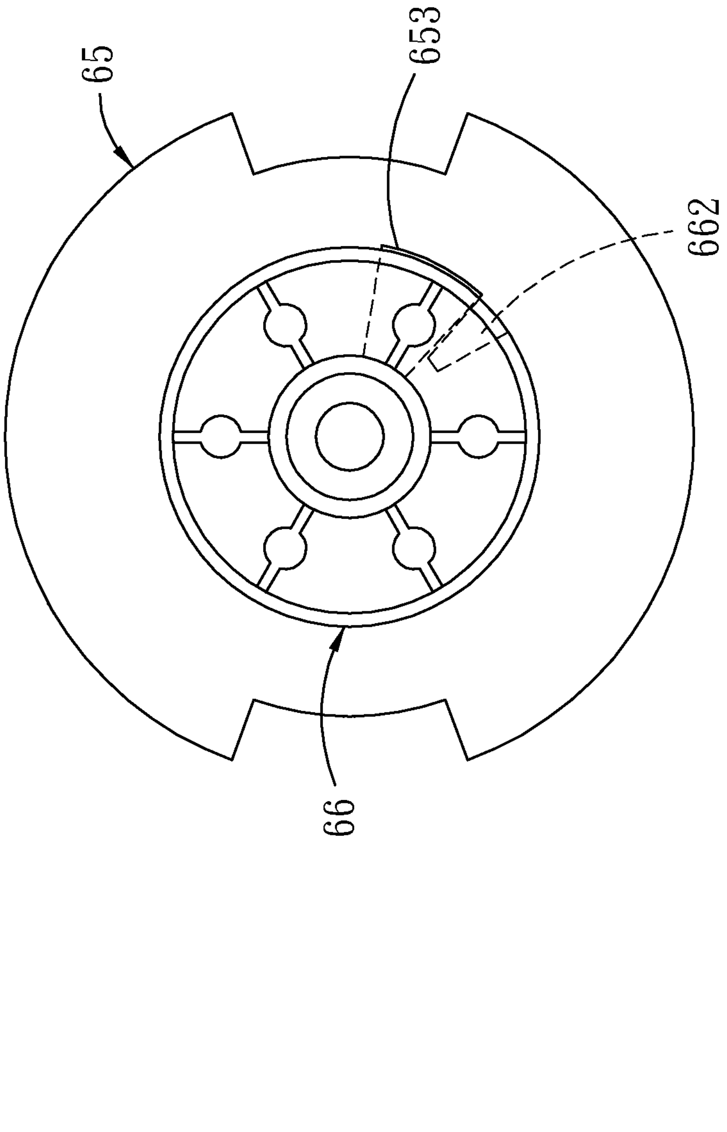
FIG. 13 is a side view of a first abutting portion abutting with a third abutting portion in FIG. 12.
Figure 17:
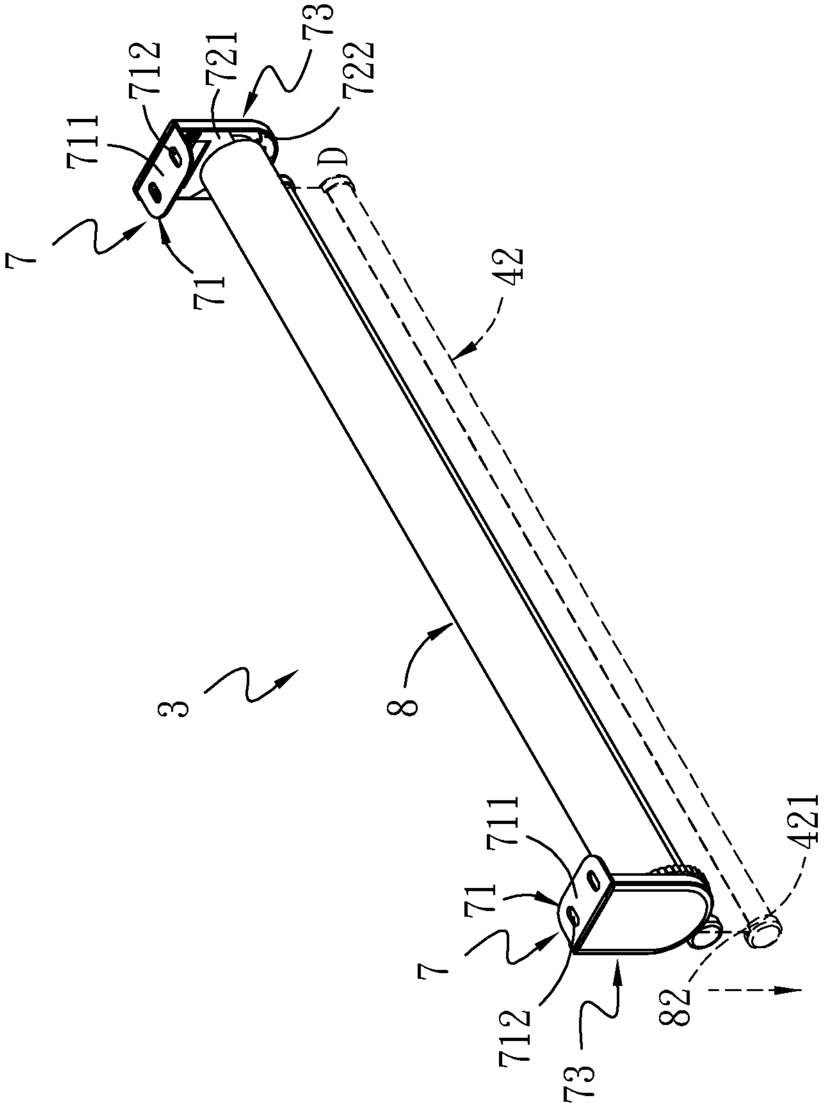
FIG. 17 is a perspective view of changing an upper limit position of the lower rail of the roller blind of the invention.
Figure 19:
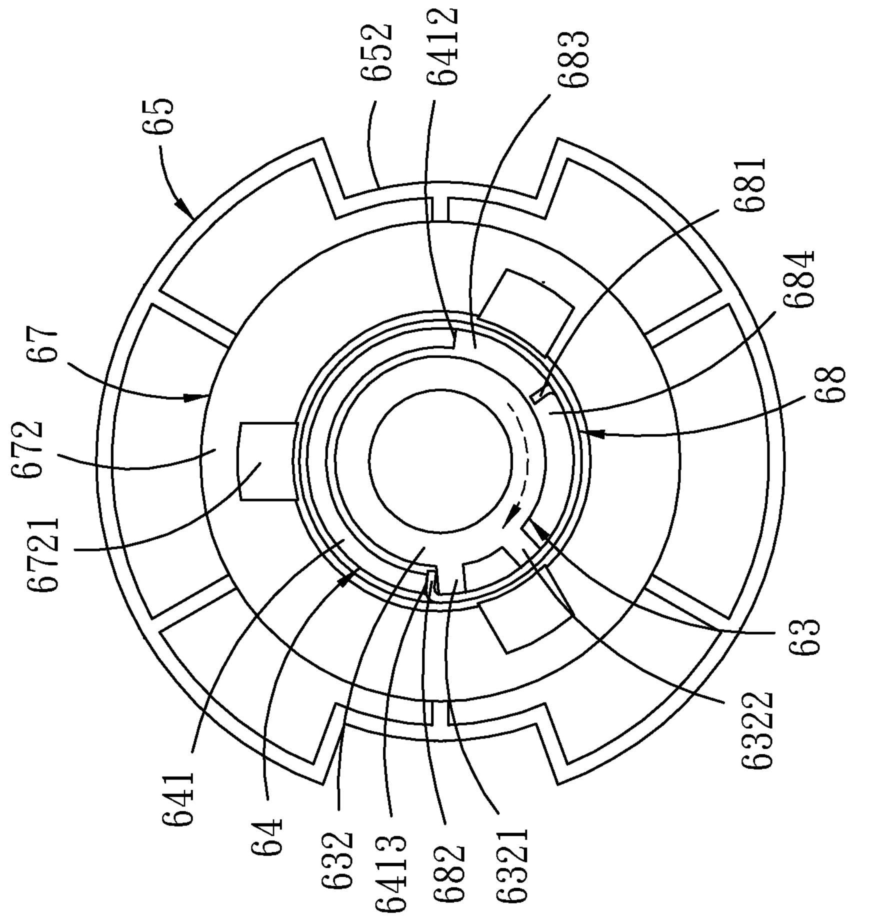
FIG. 19 is a schematic diagram of the stroke adjustment member, the position limiting elastic element and the lower position limiting stopper in FIG. 18 rotating clockwise.

Please refer to FIG. 17, FIG. 18, and FIG. 19 in conjunction with FIG. 13. After the roller blind 3 is installed, if the customer finds that the upper limit position of the lower rail 42 of the roller blind 3 is also not aligned with a window in the home, and wants to change an upper limit position of lifting the lower rail 42, the customer simply lowers the lower rail 42 to a stop point D of the upper limit position manually. There is no need to remove the upper rail 4. The shaft shell 62 and the position limiting rotational element 65 are engaged in the upper rail 4 and incapable of rotating. As the adjustment tool 9 is inserted into the hexagonal hole 6311 of the second protruding shaft 631 to drive the upper position limiting shaft 63 to rotate clockwise, the first protrusion 6321 of the shaft rod 632 rotates and pushes the other end 682 of the position limiting elastic element 68 and simultaneously pushes the second rim 6413 of the arcuate lever 641 to drive the arcuate lever 641 to rotate. The first screw thread portion 643 then rotates clockwise and moves toward the second space 676. The arcuate lever 641 moves toward the inner chamber 633 of the upper position limiting shaft 63, and at the same time the upper position limiting stopper 66 rotates and moves clockwise with the first screw thread portion 643 until the third abutting portion 662 abuts with the first abutting portion 653 of the position limiting rotational element 65, the result is that an adjustment of the stop point D of the upper limit position of the lower rail 42 is achieved, and the adjusted upper limit position is the position the upper rail 4 stops pulling the lower rail 42 upward. Thereby, by disposing the position limiting device 6 at the other end of the upper rail 4, the customer is capable of conveniently completing the adjustment by rotating manually or with the adjustment tool 9 without disassembling the overall structure of the roller blind 3.

What is claimed is:

1. A roller blind comprising:

an upper rail, having a left side and a right side;

a roller blind device, located at one end of the upper rail;

a position limiting device, located at another end of the upper rail;

two fixing brackets, respectively provided for pivotally connecting with the roller blind device and the position limiting device, and the two fixing brackets being provided for fixing at two sides above a window;

a lower rail, disposed at an interval below the upper rail; and a blind material, two ends of the blind material being respectively fixed on the upper rail and the lower rail, and the blind material being wound on a surface of the upper rail;

wherein one end of the position limiting device protrudes from an outer end of the upper rail and is combined with one of the two fixing brackets at the right side, and is also capable of adjusting a lower limit position of the lower rail and an upper limit position of the lower rail from an outer side of the one of the two fixing brackets at the right side.

2. The roller blind as claimed in claim 1, wherein:

the upper rail is provided with a limiting protrusion, an embedding groove is provided above the limiting protrusion, the embedding groove is provided for embedding an initial end of the blind material, so that the blind material is driven by the upper rail to move upward and downward;

a surface of the lower rail is provided with an elongated groove, the elongated groove is provided for a terminal end of the blind material to be inserted and fixed therein;

one end of the roller blind device is provided with a square fixing post; and the position limiting device comprises a lower position limiting shaft, a shaft shell, an upper position limiting shaft, a stroke adjustment member, a position limiting rotational element, an upper position limiting stopper, a lower position limiting stopper, and a position limiting elastic element, the lower position limiting shaft comprises a first protruding shaft located at one end of the lower position limiting shaft and protruding from one of the two fixing brackets at the right side, the first protruding shaft is a square shaft and provided with a through hole communicating with an inner hollow of the lower position limiting shaft, the lower position limiting shaft comprises a top cover connected with the first protruding shaft, and a plurality of fasteners distributed and protruding on another end of the lower position limiting shaft, each of the plurality of fasteners is provided with a hook;

the shaft shell is sleeved on an outer surface of the lower position limiting shaft and combined in the upper rail, the shaft shell is driven by the upper rail to rotate on the outer surface of the lower position limiting shaft, one end of the shaft shell comprises a concave edge, another end of the shaft shell is extended with an inner shaft with a chamber, wherein the chamber is provided for the lower position limiting shaft to be inserted into, the top cover is correspondingly disposed in the concave edge, the first protruding shaft rotates and drives the lower position limiting shaft to rotate in the chamber, an outer end of the inner shaft is provided for the plurality of fasteners to abut thereon to restrict the lower position limiting shaft from detaching, the shaft shell comprises at least one first position limiting groove corresponding to the limiting protrusion of the upper rail;

the upper position limiting shaft is disposed in the inner hollow of the lower position limiting shaft, the upper position limiting shaft comprises a second protruding shaft and a shaft rod, the second protruding shaft is located at one end of the upper position limiting shaft, the second protruding shaft is a circular protruding shaft to be inserted into the through hole of the first protruding shaft, the second protruding shaft comprises a hexagonal hole, the shaft rod protrudes from an inside of the upper position limiting shaft and from another end of the upper position limiting shaft, the other end of the upper position limiting shaft is provided with a ring groove, an inner chamber is formed between an inside of the other end of the upper position limiting shaft and the shaft rod, an outer surface of the shaft rod comprises a first protrusion and a second protrusion, one end of the first protrusion and one end of the second protrusion are connected with the ring groove of the upper position limiting shaft and do not exceed an outer diameter of the ring groove;

one end of the stroke adjustment member is inserted into the inner chamber of the upper position limiting shaft and is provided for the shaft rod to rotate therein, the stroke adjustment member comprises an arcuate lever, an annular protrusion connected with the arcuate lever, a first screw thread portion connected with the annular protrusion and protruding toward a direction opposite to the arcuate lever, and a first fixing portion connected with the first screw thread portion, the arcuate lever comprises a semi-circular arcuate groove, the semi-circular arcuate groove is provided for inserting the outer surface of the shaft rod without the first protrusion and the second protrusion and for the shaft rod to rotate therein, two sides of the arcuate lever respectively form a first rim and a second rim, an outer surface of the first fixing portion comprises an engaging body;

the position limiting rotational element is movably screwed with the stroke adjustment member and combined with the upper rail, the position limiting rotational element is driven by the upper rail to rotate and move along the stroke adjustment member, wherein the position limiting rotational element comprises a second screw thread portion and at least one second position limiting groove corresponding to the limiting protrusion of the upper rail, the second screw thread portion is correspondingly screwed with the first screw thread portion, and two sides of the position limiting rotational element are respectively provided with a first abutting portion and a second abutting portion adjacent to the second position limiting groove;

the upper position limiting stopper is connected with another end of the stroke adjustment member and rotates synchronously with the stroke adjustment member, the upper position limiting stopper includes a second fixing portion and a third abutting portion, the second fixing portion is combined with the first fixing portion of the stroke adjustment member, the third abutting portion is correspondingly abutting with the first abutting portion of the position limiting rotational element;

the lower position limiting stopper is sleeved on an outer surface of the stroke adjustment member to provide the stroke adjustment member to rotate therein, the lower position limiting stopper comprises a cylinder, a protruding flange, and a fourth abutting portion, the cylinder is sleeved on the outer surface of the stroke adjustment member, the cylinder comprises an accommodating portion, the accommodating portion comprises a first space, a second space communicating with the first space, a third space communicating with the second space, and a third screw thread portion located on an inner surface of the third space from one end to another end of the cylinder, the first space is embedded with the ring groove of the upper position limiting shaft, an inner diameter of the first space is larger than an inner diameter of the second space, the first space and the second space are provided for inserting the arcuate lever of the stroke adjustment member, a first abutting side is formed between the first space and the second space, the inner diameter of the second space is larger than an inner diameter of the third space, a second abutting side is formed between the second space and the third space, the second abutting side is provided for abutting with the annular protrusion of the stroke adjustment member, the third screw thread portion is movably screwed with the first screw thread portion of the stroke adjustment member, an outer surface of the end of the cylinder comprises a plurality of grooves, the protruding flange protrudes on the cylinder and is disposed adjacent to the grooves, the protruding flange comprises a plurality of embedding grooves corresponding to the grooves, the plurality of embedding grooves is provided for the hooks of the plurality of fasteners to insert through and hook thereon from the grooves, so that the protruding flange abuts the outer end of the inner shaft, and the lower position limiting stopper is combined with the lower position limiting shaft, the fourth abutting portion protrudes toward the outer surface of the cylinder, one end of the fourth abutting portion is connected with the protruding flange, another end of the fourth abutting portion extends to pass the other end of the cylinder, the fourth abutting portion is correspondingly abutting with the second abutting portion of the position limiting rotational element; and the position limiting elastic element is located in the first space of the lower position limiting stopper, one end of the position limiting elastic element abuts on the first abutting side, another end of the position limiting elastic element abuts on the other end of the upper position limiting shaft, a first inserting space and a second inserting space are formed through the end and the other end of the position limiting elastic element, the first inserting space is provided for the arcuate lever to insert into and rotate in a counterclockwise or a clockwise direction, and the second inserting space is provided for the first protrusion and the second protrusion of the shaft rod to insert into and rotate in a counterclockwise or a clockwise direction.

3. The roller blind as claimed in claim 2, wherein each of the two fixing brackets comprise a fixing body and a vertical stand connected below the fixing body, each of the fixing bodies comprises an L-shaped member, each of the L-shaped members comprises a plurality of fixing holes disposed in a horizontal part and a longitudinal part respectively, lower portions of the L-shaped members where the fixing holes in the longitudinal part disposed bends toward the inside, the vertical stands are respectively provided with a connecting portion connecting with a bottom end of the longitudinal part of each of the L-shaped members, and a guiding portion extending from below the connecting portion, two grooves are respectively provided on two sides of each of the guiding portions for temporarily placing the roller blind device thereon during installation, a square through hole is provided between the grooves of each of the guiding portions for inserting and positioning the fixing post of the roller blind device and the first protruding shaft of the lower position limiting shaft, a guiding groove bent toward the outside is provided below each of the through holes of each of the guiding portions, one of the guiding grooves is provided for guiding the fixing post into one of the through holes for positioning, and the other guiding groove is provided for guiding the first protruding shaft into the other through hole for positioning.

4. The roller blind as claimed in claim 3, wherein each of the two fixing brackets further comprises an outer cover, the outer covers are respectively provided with an accommodating groove and two locking blocks respectively located on two sides of an upper part of the accommodating grooves, the accommodating grooves are respectively provided for embedding the vertical stands, and the connecting portions are respectively fixed by the locking blocks.

5. The roller blind as claimed in claim 2, wherein there are three of the fasteners; wherein three of the grooves of the cylinder and three of the embedding grooves of the protruding flange are correspondingly disposed to match with the three fasteners.

6. The roller blind as claimed in claim 2, wherein the first abutting portion, the second abutting portion, and the third abutting portion are protrusions, and the fourth abutting portion is a protruding strip.

* * * * *